P. G. WOODSIDE.
Hot Air Register.
No. 7,713.
Patented Oct. 8, 1850.
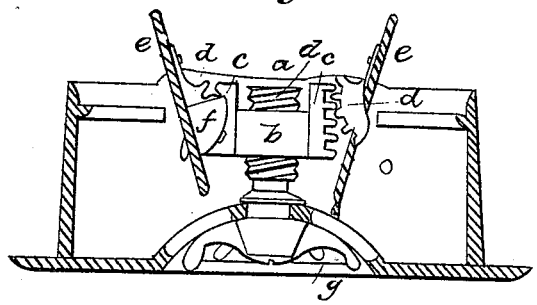
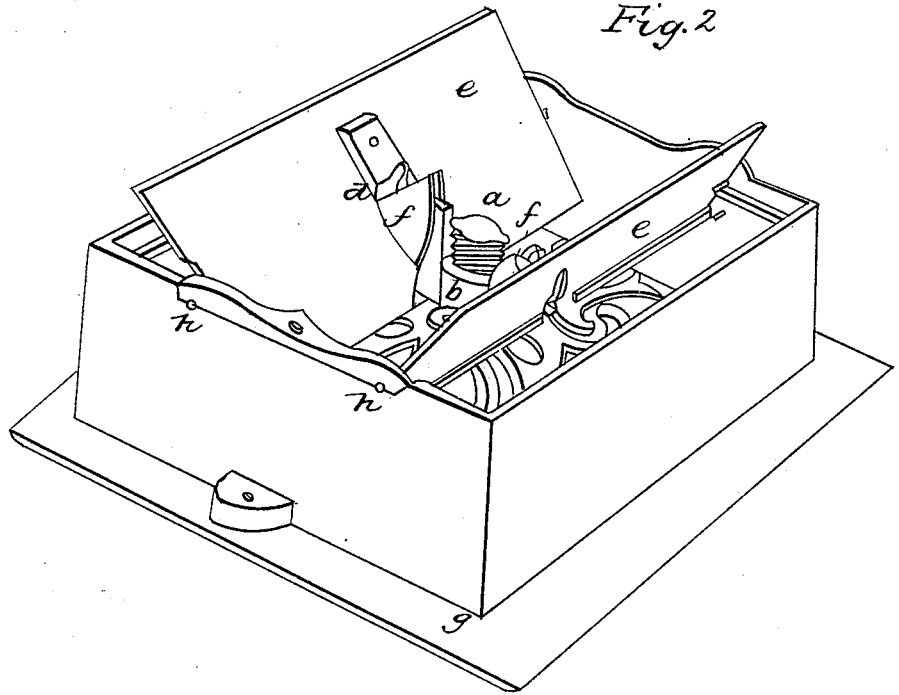

UNITED STATES PATENT OFFICE.

P. G. WOODSIDE, OF PHILADELPHIA, PENNSYLVANIA.

WARM-AIR REGISTER.

Specification of Letters Patent No. 7,713, dated October 8, 1850.

*To all whom it may concern:*

Be it known that I, PETER G. WOODSIDE, of Philadelphia, in the county of Philadelphia and State of Pennsylvania, have invented a new and Improved Mode of Opening and Closing the Valves of Warm-Air Registers; and I do hereby declare that the following is a full and exact description thereof, reference being had to the accompanying drawings and to the letters of reference marked thereon.

The nature of my improvement consists in making such an opening and closing motion to the valves of warm air registers, that they may remain in any position they may be left, without the fear of closing or opening, by the fluctuations of the current of warm air passing through the register.

To enable others skilled in the art to make and use my improvement in warm air registers I will proceed to describe its construction and operation.

Figure 1 is a section (looking in the direction of the center of motion of the valves). Fig. 2, is a perspective view showing the connection of my improvement with the register.

In the center of the ornamental front $g$, of the register I have a quick threaded screw $a$, made to turn easily, with an ornamental head to turn it by, either sunk in face of the front of the register, or projecting beyond it, as may suit the fancy of the maker, on the screw, $a$, I have a nut, $b$, with a female thread to correspond with the thread on the screw, $a$, on each side of the nut, $b$, there is a rack, $c$, fastened permanently to it, these racks, $c$, $c$, gear into two segments of pinions $d$, $d$, fastened on the valves $e$, $e$, in a line with their centers of motion, $h$, $h$, on each side of the segments of pinions, $d$, $d$, there is a small plate $f$, cast fast to the valves. These small plates $f$ $f$ $f$ $f$ are also segments of circles corresponding with the center of motion of the valves and projecting far enough beyond the segments of pinions, $d$, $d$, to embrace the racks $c$, $c$, and keep the nut $b$ from turning, now the screw, $a$, being a right hand screw by turning it toward the right hand, it will bring the nut, $b$, and the racks, $c$, $c$, toward the front of the register, [the racks, $c$, $c$, at the same being in gear, with segments of pinions, $d$, $d$, on the valves, $e$, $e$,] and will cause the valves, $e$, $e$, to open outward and by reversing the motion of the screw $a$ they will of course close.

Now I do not wish it to be understood that I claim to be the inventor of screw, racks, or segments of pinions, or of the particular shape or form of the register, or of the manner in which the valves are hung, or of the ornamental front, or the head or button for turning the screw by, but What I do claim as my invention, and desire to secure by Letters Patent, is—

The manner in which I have combined the screw, racks and segments of pinions, and the application of this combination to the purpose herein described, namely that of opening and closing the valves of warm-air registers.

PETER G. WOODSIDE.

Witnesses:
JAMES M. NEUMAN,
SAMUEL J. CRESWELL.